(12) United States Patent
Ishiguro et al.

(10) Patent No.: US 10,005,924 B2
(45) Date of Patent: Jun. 26, 2018

(54) TRANSPARENT ADHESIVE SHEET

(71) Applicant: ZEON CORPORATION, Tokyo (JP)

(72) Inventors: Atsushi Ishiguro, Tokyo (JP); Daisuke Saitou, Tokyo (JP); Teiji Kohara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 56 days.

(21) Appl. No.: 15/119,586

(22) PCT Filed: Feb. 24, 2015

(86) PCT No.: PCT/JP2015/055121
§ 371 (c)(1),
(2) Date: Aug. 17, 2016

(87) PCT Pub. No.: WO2015/129653
PCT Pub. Date: Sep. 3, 2015

(65) Prior Publication Data
US 2017/0058148 A1    Mar. 2, 2017

(30) Foreign Application Priority Data

Feb. 28, 2014 (JP) ................................. 2014-037797

(51) Int. Cl.
*C09J 7/00* (2018.01)
*C09J 153/02* (2006.01)

(52) U.S. Cl.
CPC .............. *C09J 7/00* (2013.01); *C09J 153/02* (2013.01); *C09J 153/025* (2013.01); *C09J 2201/606* (2013.01); *C09J 2201/622* (2013.01); *C09J 2203/318* (2013.01); *C09J 2423/00* (2013.01); *C09J 2453/00* (2013.01)

(58) Field of Classification Search
CPC ..... C09J 7/00; C09J 153/035; C09J 2201/606
See application file for complete search history.

(56) References Cited

U.S. PATENT DOCUMENTS

| | | | |
|---|---|---|---|
| 2003/0176582 A1* | 9/2003 | Bening | C08F 287/00 525/242 |
| 2003/0181584 A1* | 9/2003 | Handlin, Jr. | C08F 287/00 525/88 |
| 2003/0181585 A1* | 9/2003 | Handlin, Jr. | C08F 287/00 525/88 |
| 2005/0137348 A1* | 6/2005 | Bening | C08F 287/00 525/314 |
| 2010/0003425 A1 | 1/2010 | Kamata et al. | |
| 2013/0008506 A1 | 1/2013 | Tanahashi et al. | |
| 2013/0244367 A1 | 9/2013 | Kohara et al. | |
| 2015/0104654 A1 | 4/2015 | Kohara et al. | |
| 2017/0151757 A1* | 6/2017 | Kohara | B32B 17/10229 |

FOREIGN PATENT DOCUMENTS

| | | |
|---|---|---|
| EP | 0414768 A1 | 3/1991 |
| EP | 1418212 A1 | 5/2004 |
| JP | H11-174417 A | 7/1999 |
| JP | 2003-342542 A | 12/2003 |
| JP | 2005-055641 A | 3/2005 |
| JP | 2007-297582 A | 11/2007 |
| JP | 2008-281997 A | 11/2008 |
| JP | 2009-185124 A | 8/2009 |
| JP | 2012-193264 A | 10/2012 |
| JP | 2013-227427 A | 11/2013 |
| WO | 2011/096389 A1 | 8/2011 |
| WO | 2012/043708 A1 | 4/2012 |
| WO | 2013/176258 A1 | 11/2013 |

OTHER PUBLICATIONS

Kohara et al., electronic translation of JP 2014-141535 (Sep. 2014).*
Sep. 22, 2017 Search Report issued in European Patent Application No. 15755344.7.
Hu, Yuhong et al., "Block Copolymer-Based Hot-Melt Pressure-Sensitive Adhesives;" Technology of Pressure-Sensitive Adhesives and Products; National Starch and Chemical; 2008; p. 3-1-3-45.
May 26, 2015 International Search Report issued in International Patent Application No. PCT/JP2015/055121.
Sep. 6, 2016 International Preliminary Report on Patentability issued in International Patent Application No. PCT/JP2015/055121.

\* cited by examiner

*Primary Examiner* — Jeffrey C Mullis
(74) *Attorney, Agent, or Firm* — Oliff PLC

(57) ABSTRACT

The present invention is a transparent pressure-sensitive adhesive sheet that is formed of a resin composition [F], and has a storage modulus at 25° C. of $1\times10^6$ to $1\times10^8$ Pa, the resin composition [F] comprising a modified hydrogenated block copolymer [E] as a main component, the modified hydrogenated block copolymer [E] being obtained by introducing an alkoxysilyl group into a hydrogenated block copolymer [D], the hydrogenated block copolymer [D] being obtained by hydrogenating 90% or more of unsaturated bonds of a block copolymer [C] that comprises at least two polymer blocks [A] comprising a specific compound and at least one polymer block [B] comprising a specific compound, and a ratio (wA:wB) of a total weight fraction wA of the polymer block [A] in the block copolymer [C] to a total weight fraction wB of the polymer block [B] in the block copolymer [C] being 20:80 to 60:40.

10 Claims, No Drawings

TRANSPARENT ADHESIVE SHEET

TECHNICAL FIELD

The present invention relates to a transparent pressure-sensitive adhesive sheet (double-sided, transparent pressure-sensitive adhesive sheet) that is used to bond (secure) two optical members (adherends). More specifically, the invention relates to a transparent pressure-sensitive adhesive sheet that exhibits excellent reworkability and excellent adhesion.

BACKGROUND ART

A display device used for an electronic device (e.g., mobile phone, smartphone, car navigation system, personal computer, ticket vending machine, and ATM) has a structure in which a touch panel and a transparent protective sheet are disposed at a given gap (formed by an air layer) from a display panel (e.g., liquid crystal display panel or organic EL display panel). However, the structure in which such a gap is provided (e.g., a structure in which a gap is formed between the display panel and the transparent protective sheet, or between the display panel and the touch panel, or between the touch panel and the transparent protective sheet) has a problem in that loss of light by reflection may occur to a large extent due to the difference in refractive index between the touch panel or the transparent protective sheet and the air layer, and good visibility may not be obtained. Therefore, a method that fills the gap with a transparent photocurable resin or thermosetting resin and cures the transparent photocurable resin or thermosetting resin, or a method that fills the gap with a transparent pressure-sensitive adhesive sheet or the like has been used in order to improve visibility while improving the strength of the protective panel to prevent a situation in which breakage and scattering occur due to an impact (see Patent Literature 1 to 8, for example).

Such a transparent filling material is required to exhibit reworkability that ensures that, when the touch panel is bonded to the screen of the display device through the transparent filling material, and bonding failure or the like has been found, the transparent filling material can be removed from the touch panel and/or the display device, and the touch panel and/or the display device can be recycled.

However, the method that fills the gap with a transparent photocurable resin or thermosetting resin and cures the transparent photocurable resin or thermosetting resin has a problem in that adhesion to the adherend increases, and reworkability cannot be obtained. Moreover, the display panel may be deformed due to the cure shrinkage of the resin, or air bubbles may be easily mixed when filling the gap with the curable resin.

The method that fills the gap with the transparent pressure-sensitive adhesive sheet can prevent the deformation of the display panel, and ensure reworkability.

However, the known method that fills the gap with the transparent pressure-sensitive adhesive sheet cannot achieve both easy reworkability and high tackiness in a satisfactory manner.

CITATION LIST

Patent Literature

Patent Literature 1: JP-A-11-174417
Patent Literature 2: JP-A-2005-55641
Patent Literature 3: JP-A-2007-297582
Patent Literature 4: JP-A-2008-281997 (US2010/0003425A1)
Patent Literature 5: JP-A-2003-342542
Patent Literature 6: JP-A-2009-185124
Patent Literature 7: JP-A-2012-193264
Patent Literature 8: JP-A-2013-227427

SUMMARY OF INVENTION

Technical Problem

An object of the invention is to provide a transparent pressure-sensitive adhesive sheet (double-sided, transparent pressure-sensitive adhesive sheet) that is used to bond (secure) two optical members (adherends), and exhibits excellent reworkability and excellent adhesion.

Solution to Problem

The inventors conducted extensive studies in order to achieve the above object. As a result, the inventors found that a transparent pressure-sensitive adhesive sheet that is formed of a resin composition [F] that includes a specific alkoxysilyl group-containing modified hydrogenated block copolymer [E] as the main component, and has a storage modulus at 25° C. within a specific range, exhibits excellent reworkability and excellent adhesion (i.e., the transparent pressure-sensitive adhesive sheet exhibits excellent reworkability when bonded to the adherend at a low temperature, and exhibits excellent adhesion when heated at a high temperature). This finding has led to the completion of the invention.

According to one aspect of the invention, a transparent pressure-sensitive adhesive sheet is formed of a resin composition [F], and has a storage modulus at 25° C. of $1 \times 10^6$ to $1 \times 10^8$ Pa, the resin composition [F] comprising a modified hydrogenated block copolymer [E] as the main component, the modified hydrogenated block copolymer [E] being obtained by introducing an alkoxysilyl group into a hydrogenated block copolymer [D], the hydrogenated block copolymer [D] being obtained by hydrogenating 90% or more of the unsaturated bonds of a block copolymer [C] that comprises at least two polymer blocks [A] and at least one polymer block [B], the polymer block [A] comprising a repeating unit derived from an aromatic vinyl compound as the main component, the polymer block [B] comprising a repeating unit derived from a linear conjugated diene compound as the main component, and the ratio (wA:wB) of the total weight fraction wA of the polymer block [A] in the block copolymer [C] to the total weight fraction wB of the polymer block [B] in the block copolymer [C] being 20:80 to 60:40.

It is preferable that the transparent pressure-sensitive adhesive sheet be formed of the resin composition [F] that further comprises a hydrocarbon-based polymer [G] having a number average molecular weight of 300 to 5,000 in a ratio of 1 to 60 parts by weight based on 100 parts by weight of the modified hydrogenated block copolymer [E].

It is preferable that the transparent pressure-sensitive adhesive sheet be formed of the resin composition [F] that further comprises a tackifier [H] in a ratio of 1 to 50 parts by weight based on 100 parts by weight of the modified hydrogenated block copolymer [E].

Advantageous Effects of Invention

One aspect of the invention thus provides a transparent pressure-sensitive adhesive sheet (double-sided, transparent pressure-sensitive adhesive sheet) that is used to bond (secure) two optical members (adherends), and exhibits excellent reworkability and excellent adhesion.

DESCRIPTION OF EMBODIMENTS

A transparent pressure-sensitive adhesive sheet according to one embodiment of the invention is formed of a resin composition [F], and has a storage modulus at 25° C. within a specific range, the resin composition [F] comprising a modified hydrogenated block copolymer [E] as the main component, the modified hydrogenated block copolymer [E] being obtained by introducing an alkoxysilyl group into a hydrogenated block copolymer [D], the hydrogenated block copolymer [D] being obtained by hydrogenating 90% or more of the unsaturated bonds of a block copolymer [C] (see below).

1. Block Copolymer [C]

The block copolymer [C] includes at least two polymer blocks [A] and at least one polymer block [B].

The polymer block [A] includes a structural unit (repeating unit) derived from an aromatic vinyl compound as the main component. The content of the structural unit derived from an aromatic vinyl compound in the polymer block [A] is normally 90 wt % or more, preferably 95 wt % or more, and more preferably 99 wt % or more. When the content of the structural unit derived from an aromatic vinyl compound in the polymer block [A] is within the above range, the transparent pressure-sensitive adhesive sheet according to one embodiment of the invention exhibits high heat resistance.

The polymer block [A] may include a component other than the structural unit derived from an aromatic vinyl compound. The polymer block [A] may include either or both of a structural unit derived from a linear conjugated diene compound and a structural unit derived from an additional vinyl compound as the component other than the structural unit derived from an aromatic vinyl compound. The content of the component other than the structural unit derived from an aromatic vinyl compound in the polymer block [A] is normally 10 wt % or less, preferably 5 wt % or less, and more preferably 1 wt % or less. A plurality of polymer blocks [A] may be either identical or different as long as the above range is satisfied.

The polymer block [B] includes a structural unit (repeating unit) derived from a linear conjugated diene compound as the main component. The content of the structural unit derived from a linear conjugated diene compound in the polymer block [B] is normally 90 wt % or more, preferably 95 wt % or more, and more preferably 99 wt % or more. When the content of the structural unit derived from a linear conjugated diene compound in the polymer block [B] is within the above range, the transparent pressure-sensitive adhesive sheet according to one embodiment of the invention exhibits excellent flexibility.

The polymer block [B] may include a component other than the structural unit derived from a linear conjugated diene compound. The polymer block [B] may include either or both of a structural unit derived from an aromatic vinyl compound and a structural unit derived from an additional vinyl compound as the component other than the structural unit derived from a linear conjugated diene compound. The content of the component other than the structural unit derived from a linear conjugated diene compound in the polymer block [B] is normally 10 wt % or less, preferably 5 wt % or less, and more preferably 1 wt % or less. If the content of the structural unit derived from an aromatic vinyl compound in the polymer block [B] is high, the transparent pressure-sensitive adhesive sheet may exhibit low flexibility at a low temperature.

When the block copolymer [C] includes a plurality of polymer blocks [B], the plurality of polymer blocks [B] may be either identical or different as long as the above range is satisfied.

Specific examples of the aromatic vinyl compound include styrene; styrenes that is substituted with an alkyl group, such as α-methylstyrene, 2-methylstyrene, 3-methylstyrene, 4-methylstyrene, 2,4-diisopropylstyrene, 2,4-dimethylstyrene, 4-t-butylstyrene, and 5-t-butyl-2-methylstyrene; styrenes that is substituted with a halogen atom, such as 4-monochlorostyrene, dichlorostyrene, and 4-monofluorostyrene; styrenes that is substituted with an aryl group, such as 4-phenylstyrene; and the like. Among these, an aromatic vinyl compound that does not include a polar group (e.g., styrene and styrenes that is substituted with an alkyl group) is preferable from the viewpoint of hygroscopicity, and styrene is particularly preferable from the viewpoint of industrial availability.

Specific examples of the linear conjugated diene compound include 1,3-butadiene, isoprene, 2,3-dimethyl-1,3-butadiene, 1,3-pentadiene, and the like. Among these, a linear conjugated diene compound that does not include a polar group is preferable from the viewpoint of hygroscopicity, and 1,3-butadiene and isoprene are particularly preferable from the viewpoint of industrial availability.

Examples of the additional vinyl compound include a vinyl compound such as a linear vinyl compound and a cyclic vinyl compound, an unsaturated cyclic acid anhydride, an unsaturated imide compound, and the like. These compounds may be substituted with a nitrile group, an alkoxycarbonyl group, a hydroxycarbonyl group, a halogen atom, or the like. Specific examples of the additional vinyl compound include a linear olefin such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene; and a cycloolefin such as vinylcyclohexane; and the like. Among these, a vinyl compound that does not include a polar group is preferable from the viewpoint of hygroscopicity, a linear olefin is more preferable, and ethylene and propylene are particularly preferable.

The number of polymer blocks [A] included in the block copolymer [C] is normally 5 or less, preferably 4 or less, and more preferably 3 or less. The number of polymer blocks [B] included in the block copolymer [C] is normally 4 or less, preferably 3 or less, and more preferably 2 or less.

When the block copolymer [C] includes either or both of a plurality of polymer blocks [A] and a plurality of polymer blocks [B], the ratio (Mw(A1)/Mw(A2)) of the weight average molecular weight Mw(A1) of the polymer block among the plurality of polymer blocks [A] that has the highest weight average molecular weight to the weight average molecular weight Mw(A2) of the polymer block among the plurality of polymer blocks [A] that has the lowest weight average molecular weight, and the ratio (Mw(B1)/Mw(B2)) of the weight average molecular weight Mw(B1) of the polymer block among the plurality of polymer blocks [B] that has the highest weight average molecular weight to the weight average molecular weight Mw(B2) of the polymer block among the plurality of polymer blocks [B] that has the lowest weight average molecular weight, are 2.0 or less, preferably 1.5 or less, and more preferably 1.2 or less.

The block copolymer [C] may be a linear block copolymer or a radial block copolymer. It is preferable that the block copolymer [C] be a linear block copolymer since excellent mechanical strength can be obtained. It is most preferable that the block copolymer [C] be a triblock copolymer ([A]-[B]-[A]) in which the polymer block [A] is bonded to each end of the polymer block [B], or a pentablock copolymer ([A]-[B]-[A]-[B]-[A]) in which the polymer block [B] is bonded to each end of the polymer block [A], and the polymer block [A] is bonded to the other end of each polymer block [B].

The ratio (wA:wB) of the total weight fraction wA of the polymer block [A] in the block copolymer [C] to the total weight fraction wB of the polymer block [B] in the block copolymer [C] is 20:80 to 60:40, preferably 25:75 to 55:45, and more preferably 30:70 to 50:50. If the total weight fraction wA is too high, the resulting transparent pressure-sensitive adhesive sheet may exhibit low flexibility, poor adhesion, and an insufficient irregularity filling capability. If the total weight fraction wA is too low, the resulting transparent pressure-sensitive adhesive sheet may exhibit insufficient heat resistance.

The polystyrene-equivalent weight average molecular weight (Mw) of the block copolymer [C] determined by gel permeation chromatography (GPC) (eluent: tetrahydrofuran (THF)) is normally 40,000 to 200,000, preferably 50,000 to 150,000, and more preferably 60,000 to 100,000. The molecular weight distribution (Mw/Mn) of the block copolymer [C] is preferably 3 or less, more preferably 2 or less, and particularly preferably 1.5 or less.

The block copolymer (C) may be produced using a method that alternately polymerizes a monomer mixture (a) that includes the aromatic vinyl compound as the main component, and a monomer mixture (b) that includes the linear conjugated diene compound as the main component, through living anionic polymerization or the like; or a method that sequentially polymerizes a monomer mixture (a) that includes the aromatic vinyl compound as the main component, and a monomer mixture (b) that includes the linear conjugated diene compound as the main component, and couples the terminals of the resulting polymer block [B] using a coupling agent, for example.

The content of the aromatic vinyl compound in the monomer mixture (a) is normally 90 wt % or more, preferably 95 wt % or more, and more preferably 99 wt % or more. The monomer mixture (a) may include a linear conjugated diene compound and an additional vinyl compound as a monomer component in addition to the aromatic vinyl compound.

The content of the linear conjugated diene compound in the monomer mixture (b) is normally 90 wt % or more, preferably 95 wt % or more, and more preferably 99 wt % or more. The monomer mixture (b) may include an aromatic vinyl compound and an additional vinyl compound as a monomer component in addition to the linear conjugated diene compound.

2. Hydrogenated Block Copolymer [D]

The hydrogenated block copolymer [D] used in connection with one embodiment of the invention is obtained by hydrogenating the carbon-carbon unsaturated bonds included in the main chain, the side chain, and the aromatic ring of the block copolymer [C]. The hydrogenation rate of the hydrogenated block copolymer [D] is normally 90% or more, preferably 97% or more, and more preferably 99% or more. The resulting transparent pressure-sensitive adhesive sheet exhibits better light resistance and heat resistance as the hydrogenation rate increases. The hydrogenation rate of the hydrogenated block copolymer [D] may be determined by $^1$H-NMR analysis.

The unsaturated bond hydrogenation method, the reaction configuration, and the like are not particularly limited. It is preferable to use a hydrogenation method that can increase the hydrogenation rate, and causes a polymer chain cleavage reaction to only a small extent. Examples of such a hydrogenation method include the method disclosed in WO2011/096389, the method disclosed in WO2012/043708, and the like.

The hydrogenated block copolymer [D] obtained as described above is collected from the reaction solution including the hydrogenated block copolymer [D] after removing either or both of a hydrogenation catalyst and a polymerization catalyst from the reaction solution. The hydrogenated block copolymer [D] thus collected is normally pelletized, and subjected to the subsequent alkoxysilyl group introduction step.

The polystyrene-equivalent weight average molecular weight (Mw) of the hydrogenated block copolymer [D] determined by GPC (eluent: THF) is normally 40,000 to 200,000, preferably 50,000 to 150,000, and more preferably 60,000 to 100,000.

The molecular weight distribution (Mw/Mn) of the hydrogenated block copolymer [D] is preferably 3 or less, more preferably 2 or less, and particularly preferably 1.5 or less. When the weight average molecular weight (Mw) and the molecular weight distribution (Mw/Mn) of the hydrogenated block copolymer [D] are within the above ranges, the heat resistance and the mechanical strength of the resulting transparent pressure-sensitive adhesive sheet are maintained.

3. Modified Hydrogenated Block Copolymer [E]

The modified hydrogenated block copolymer [E] used in connection with one embodiment of the invention is obtained by reacting the hydrogenated block copolymer [D] with an ethylenically unsaturated silane compound in the presence of an organic peroxide to introduce an alkoxysilyl group into the hydrogenated block copolymer [D]. The alkoxysilyl group may be bonded directly to the hydrogenated block copolymer [D], or may be bonded to the hydrogenated block copolymer [D] through a divalent organic group (e.g., alkylene group or alkyleneoxycarbonylalkylene group).

The alkoxysilyl group is normally introduced in a ratio of 0.1 to 10 parts by weight, preferably 0.2 to 5 parts by weight, and more preferably 0.3 to 3 parts by weight, based on 100 parts by weight of the hydrogenated block copolymer [D]. If the alkoxysilyl group is introduced in too high a ratio, the alkoxysilyl groups decomposed due to a small amount of water or the like may be crosslinked to a large extent (before melt-forming the resulting modified hydrogenated block copolymer [E] to have the desired shape), whereby gelation may occur, or a decrease in formability may occur due to a decrease in melt-flowability, for example. If the alkoxysilyl group is introduced in too low a ratio, the resulting transparent pressure-sensitive adhesive sheet may exhibit insufficient adhesion when the transparent pressure-sensitive adhesive sheet is bonded to the adherend (e.g., glass, polyethylene terephthalate film (hereinafter may be referred to as "PET film"), or triacetyl cellulose film (hereinafter may be referred to as "TAC film")). The introduction of an alkoxysilyl group may be determined from the IR spectrum. The alkoxysilyl group introduction amount is calculated from the ¹H-NMR spectrum. Note that the number of integrations is increased when the alkoxysilyl group introduction amount is small.

The ethylenically unsaturated silane compound is not particularly limited as long as the ethylenically unsaturated silane compound undergoes graft polymerization with the hydrogenated block copolymer [D] to introduce the alkoxysilyl group into the hydrogenated block copolymer [D]. Examples of a preferable ethylenically unsaturated silane compound include a vinyltrialkoxysilane such as vinyltrimethoxysilane and vinyltriethoxysilane; an allyltrialkoxysilane such as allyltrimethoxysilane and allyltriethoxysilane; a dialkoxyalkylvinylsilane such as dimethoxymethylvinylsilane and diethoxymethylvinylsilane; a p-styryltrialkoxysilane such as p-styryltrimethoxysilane; a (meth)acryloxyalkylalkyldialkoxysilane such as 3-methacryloxypropylmethyldimethoxysilane; a (meth) acryloxyalkyltrialkoxysilane such as 3-methacryloxypropyltrimethoxysilane and 3-acryloxypropyltrimethoxysilane; and the like.

These ethylenically unsaturated silane compounds may be used either alone or in combination. The ethylenically unsaturated silane compound is normally used in a ratio of 0.1 to 10 parts by weight, preferably 0.2 to 5 parts by weight, and more preferably 0.3 to 3 parts by weight, based on 100 parts by weight of the hydrogenated block copolymer [D].

A peroxide having a one-minute half-life temperature of 170 to 190° C. is preferably used as the peroxide. For example, it is preferable to use t-butylcumyl peroxide, dicumyl peroxide, di-t-hexyl peroxide, 2,5-dimethyl-2,5-di (t-butylperoxy)hexane, di-t-butyl peroxide, di-(2-t-butylperoxyisopropyl)benzene, or the like.

These peroxides may be used either alone or in combination. The peroxide is normally used in a ratio of 0.05 to 2 parts by weight, preferably 0.1 to 1 part by weight, and more preferably 0.2 to 0.5 parts by weight, based on 100 parts by weight of the hydrogenated block copolymer [D].

The hydrogenated block copolymer [D] and the ethylenically unsaturated silane compound may be reacted in the presence of the peroxide using an arbitrary method. For example, the hydrogenated block copolymer [D] and the ethylenically unsaturated silane compound may be kneaded (mixed) at the desired temperature for the desired time using a twin-screw kneader to introduce an alkoxysilyl group. The kneading (mixing) temperature is normally 180 to 220° C., preferably 185 to 210° C., and more preferably 190 to 200° C. The kneading (heating) time is normally 0.1 to 10 minutes, preferably 0.2 to 5 minutes, and more preferably about 0.3 to 2 minutes. The mixture may be continuously kneaded and extruded so that the temperature and the residence time fall within the above ranges.

The molecular weight of the modified hydrogenated block copolymer [E] is substantially the same as that of the hydrogenated block copolymer [D] used as the raw material since only a small amount of alkoxysilyl groups are introduced into the hydrogenated block copolymer [D]. However, since the hydrogenated block copolymer [D] is reacted with the ethylenically unsaturated silane compound in the presence of the organic peroxide, the polymer also undergoes a crosslinking reaction and a cleavage reaction, and the molecular weight distribution of the hydrogenated block copolymer broadens. The polystyrene-equivalent weight average molecular weight (Mw) of the modified hydrogenated block copolymer [E] determined by GPC (eluent: THF) is normally 40,000 to 200,000, preferably 50,000 to 150,000, and more preferably 60,000 to 100,000. The molecular weight distribution (Mw/Mn) of the modified hydrogenated block copolymer [E] is preferably 3.5 or less, more preferably 2.5 or less, and particularly preferably 2.0 or less. When the weight average molecular weight (Mw) and the molecular weight distribution (Mw/Mn) of the modified hydrogenated block copolymer [E] are within the above ranges, the resulting transparent pressure-sensitive adhesive sheet exhibits excellent mechanical strength, and it is possible to reduce the occurrence of breakage or tear of the sheet during reworking.

4. Resin Composition [F] Including Modified Hydrogenated Block Copolymer [E] as Main Component The resin composition [F] used in connection with one embodiment of the invention includes the modified hydrogenated block copolymer [E] as the main component. The content of the modified hydrogenated block copolymer [E] in the resin composition [F] is normally 60 wt % or more, preferably 70 wt % or more, and more preferably 80 wt % or more, in order to achieve the advantageous effects of the invention.

The resin composition [F] used in connection with one embodiment of the invention may include either or both of a low-molecular-weight hydrocarbon-based polymer [G] and a tackifier [H], and the like in addition to the modified hydrogenated block copolymer [E] in order to adjust the flexibility of the pressure-sensitive adhesive sheet with respect to the adherend (e.g., glass, PET film, or TAC film), and adjust the adhesion of the pressure-sensitive adhesive sheet. An antioxidant, a UV absorber, a light stabilizer, an anti-blocking agent, and the like may be added to the resin composition [F] in order to improve thermal stability, light resistance, workability, and the like.

The low-molecular-weight hydrocarbon-based polymer [G] may be added to the resin composition [F] used in connection with one embodiment of the invention in order to improve the flexibility of the resin composition [F]. It is preferable that the hydrocarbon-based polymer [G] be uniformly dissolved or dispersed in the modified hydrogenated block copolymer [E], and have a number average molecular weight of 300 to 5,000. Specific examples of the hydrocarbon-based polymer [G] include low-molecular-weight polyisobutylene, low-molecular-weight polybutene, low-molecular-weight poly-4-methylpentene, low-molecular-weight poly-1-octene, a low-molecular-weight ethylene-α-olefin copolymer, and hydrogenated products thereof; low-molecular-weight polyisoprene, a low-molecular-weight polyisoprene-butadiene copolymer, hydrogenated products thereof; and the like. Among these, low-molecular-weight hydrogenated polyisobutylene and low-molecular-weight hydrogenated polyisoprene are preferable since a pressure-sensitive adhesive resin composition that exhibits excellent transparency and excellent light resistance can be obtained.

The polystyrene-equivalent number average molecular weight (Mn) of the hydrocarbon-based polymer [G] determined by GPC (eluent: THF) is normally 300 to 5,000, preferably 500 to 4,000, and more preferably 1,000 to 3,000. If the number average molecular weight (Mn) of the hydrocarbon-based polymer [G] is less than 300, air bubbles may be easily formed when melt-forming the resin composition [F] that includes the modified hydrogenated block copolymer [E] as the main component, and further includes the hydrocarbon-based polymer [G]. If the number average molecular weight (Mn) of the hydrocarbon-based polymer [G] exceeds 5,000, the resin composition [F] that includes the modified hydrogenated block copolymer [E] as the main component, and further includes the hydrocarbon-based polymer [G], may show a decrease in transparency, and may not be suitably used for optical applications.

The hydrocarbon-based polymer [G] is normally used to produce the resin composition [F] used in connection with one embodiment of the invention in a ratio of 60 parts by weight or less, preferably 1 to 50 parts by weight, and more preferably 5 to 40 parts by weight, based on 100 parts by weight of the modified hydrogenated block copolymer [E]. An improvement in flexibility can be achieved by increasing the ratio of the hydrocarbon-based polymer [G]. In this case, however, a decrease in transparency may occur. When the hydrocarbon-based polymer [G] is used in a ratio within the above range, it is possible to adjust the flexibility of the transparent pressure-sensitive adhesive sheet according to one embodiment of the invention to a range that facilitates reworking while maintaining transparency.

The tackifier [H] may be added to the resin composition [F] used in connection with one embodiment of the invention in order to improve the tackiness of the resin composition [F]. Examples of the tackifier [H] include a rosin-based resin; a terpene-based resin; a coumarone-indene resin; a styrene-based resin; an aliphatic, alicyclic, or aromatic petroleum resin; hydrogenated products thereof; and the like. At least one resin selected from these resins may be used as the tackifier [H].

The tackifier [H] is normally used to produce the resin composition [F] used in connection with one embodiment of the invention in a ratio of 60 parts by weight or less, preferably 1 to 50 parts by weight, and more preferably 5 to 40 parts by weight, based on 100 parts by weight of the modified hydrogenated block copolymer [E]. An improvement in tackiness can be achieved by increasing the ratio of the tackifier [H]. In this case, however, a decrease in removability from the adherend and a decrease in reworkability may occur. When the tackifier [H] is used in a ratio within the above range, it is possible to adjust the tackiness of the transparent pressure-sensitive adhesive sheet to a range that facilitates reworking.

The ratio of the hydrocarbon-based polymer [G] and the ratio of the tackifier [H] are appropriately selected so that the transparent pressure-sensitive adhesive sheet according to one embodiment of the invention has a storage modulus at 25° C. of $1\times10^6$ to $1\times10^8$ Pa, and has a 180° peel strength (peel rate: 100 mm/min) at 25° C. of 0.1 to 2.0 N/cm when bonded to the adherend.

Either or both of the low-molecular-weight hydrocarbon-based polymer [G] and the tackifier [H] may be mixed with the modified hydrogenated block copolymer [E] using a method that melts the modified hydrogenated block copolymer [E] using a twin-screw kneader, a roll, a Brabender, an extruder, or the like, and kneads the molten modified hydrogenated block copolymer [E] together with either or both of the low-molecular-weight hydrocarbon-based polymer [G] and the tackifier [H]; a method that melts the modified hydrogenated block copolymer [E] using a twin-screw kneader, a roll, a Brabender, an extruder, or the like, kneads the molten modified hydrogenated block copolymer [E] together with either or both of the low-molecular-weight hydrocarbon-based polymer [G] and the tackifier [H], and reacts the resulting resin composition with the ethylenically unsaturated silane compound in the presence of the peroxide; a method that kneads either or both of the low-molecular-weight hydrocarbon-based polymer [G] and the tackifier [H] when reacting the hydrogenated block copolymer [D] with the ethylenically unsaturated silane compound in the presence of the peroxide; or the like.

An antioxidant, a UV absorber, a light stabilizer, an anti-blocking agent, and the like may be added to the resin composition [F] used in connection with one embodiment of the invention in order to improve thermal stability, light resistance, workability, and the like. These additives may be used either alone or in combination. These additives are normally added in a ratio of 10 parts by weight or less, preferably 3 parts by weight or less, and more preferably 1 part by weight or less, based on 100 parts by weight of the modified hydrogenated block copolymer [E].

Examples of the antioxidant include a phosphorus-based antioxidant, a phenol-based antioxidant, a sulfur-based antioxidant, and the like. Examples of the UV absorber include a benzophenone-based UV absorber, a salicylate-based UV absorber, a benzotriazole-based UV absorber, and the like. A hindered amine-based light stabilizer is preferable as the light stabilizer. Examples of the hindered amine-based light stabilizer include a compound that includes a 3,5-di-t-butyl-4-hydroxyphenyl group in the structure, a compound that includes a 2,2,6,6-tetramethylpiperidyl group in the structure, a compound that includes a 1,2,2,6,6-pentamethyl-4-piperidyl group in the structure, and the like.

Each additive may be added to the modified hydrogenated block copolymer [E] using an arbitrary method. For example, each additive may be mixed (kneaded) with the modified hydrogenated block copolymer [E], or the resin composition [F] that includes either or both of the hydrocarbon-based polymer [G] and the tackifier [H] in addition to the modified hydrogenated block copolymer [E] (that has been melted), using a twin-screw kneader, a roll, a Brabender, an extruder, or the like.

5. Transparent Pressure-Sensitive Adhesive Sheet

The transparent pressure-sensitive adhesive sheet according to one embodiment of the invention is formed of the resin composition [F] that comprises the modified hydrogenated block copolymer [E] as the main component. The transparent pressure-sensitive adhesive sheet according to one embodiment of the invention exhibits excellent light transmittance (transparency) in the visible region. The light transmittance (wavelength: 450 to 700 nm) of the transparent pressure-sensitive adhesive sheet (thickness: 300 nm) according to one embodiment of the invention is normally 88% or more, preferably 89% or more, and more preferably 90% or more.

It is preferable that the transparent pressure-sensitive adhesive sheet according to one embodiment of the invention have a storage modulus at 25° C. of $1\times10^6$ to $1\times10^8$ Pa, more preferably $2\times10^6$ to $5\times10^7$ Pa, and still more preferably $3\times10^6$ to $1\times10^7$ Pa, from the viewpoint of tackiness with respect to the adherend and reworkability. In this case, when a touch panel is bonded to the screen of a display device through the transparent pressure-sensitive adhesive sheet according to one embodiment of the invention, for example, the transparent pressure-sensitive adhesive sheet can be removed from the touch panel and the screen of the display device. This makes it possible to recycle the touch panel and the display device. If the storage modulus is less than $1\times10^6$ Pa, the sheet formed of the resin composition [F] may be too soft, and show a significant elongation during removal (i.e., exhibit poor reworkability). If the storage modulus exceeds $1\times10^8$ Pa, the sheet formed of the resin composition [F] may be too hard, and exhibit poor tackiness. When the modified hydrogenated block copolymer [E] has a high storage modulus, the storage modulus can be decreased to the desired value by adding the hydrocarbon-based polymer [G]. Since a decrease in storage modulus can also be achieved by adding the tackifier [H], the ratio of the hydrocarbon-based polymer [G] and the ratio of the tackifier [H] may be adjusted within the above ranges so that the desired storage modulus can be obtained.

The transparent pressure-sensitive adhesive sheet according to one embodiment of the invention exhibits excellent reworkability in a state in which the transparent pressure-sensitive adhesive sheet is bonded to the adherend at a low temperature, and exhibits high adhesion when heated at a high temperature. The transparent pressure-sensitive adhesive sheet is normally bonded to the adherend at a temperature of 30 to 90° C., preferably 40 to 80° C., and more preferably 50 to 70° C.

The transparent pressure-sensitive adhesive sheet may be bonded to the adherend using a method that places the transparent pressure-sensitive adhesive sheet on the adherend, and compression-bonds the laminate using a rubber roller, a method that places the transparent pressure-sensitive adhesive sheet on the adherend, and compression-bonds the laminate using a vacuum laminator, or a method that places the transparent pressure-sensitive adhesive sheet on the adherend, and compression-bonds the laminate using an autoclave. It is preferable that the transparent pressure-sensitive adhesive sheet have a 180° peel strength of 0.1 to 2.0 N/cm, more preferably 0.2 to 1.5 N/cm, and still more preferably 0.3 to 1.0 N/cm, from the viewpoint of ensuring excellent reworkability. Since the modified hydrogenated block copolymer [E] that has a high storage modulus exhibits low tackiness, the tackiness of the modified hydrogenated block copolymer [E] may be increased by adding the tackifier [H] so that the peel strength falls within the preferable range. The modified hydrogenated block copolymer [E] that has a low storage modulus exhibits high tackiness. In this case, the tackifier [H] may also be added so that the desired peel strength can be obtained.

The transparent pressure-sensitive adhesive sheet according to one embodiment of the invention may be bonded to the adherend in a reworkable state, and may be strongly bonded to the adherend by heating when no abnormalities (e.g., abnormal external appearance) are observed. In this case, the heating (re-heating) temperature is normally 80 to 180° C., preferably 90 to 170° C., and more preferably 100 to 160° C.

It is desirable to perform heating (re-heating) so that the 180° peel strength after heating (re-heating) is normally 3.0 N/cm or more, preferably 5.0 N/cm or more, and more preferably 7.0 N/cm or more.

The thickness of the transparent pressure-sensitive adhesive sheet according to one embodiment of the invention is normally 20 to 500 μm, preferably 30 to 300 μm, and more preferably 40 to 150 μm. When the thickness of the transparent pressure-sensitive adhesive sheet is within the above range, it is possible to reduce or suppress a situation in which the transparent pressure-sensitive adhesive sheet breaks when the transparent pressure-sensitive adhesive sheet is removed from the adherend, and provide the transparent pressure-sensitive adhesive sheet so that no gap is formed between the transparent pressure-sensitive adhesive sheet and the adherend.

The transparent pressure-sensitive adhesive sheet according to one embodiment of the invention may be produced using an arbitrary method. The transparent pressure-sensitive adhesive sheet according to one embodiment of the invention may be produced using a known melt extrusion method or the like. The film-forming conditions are appropriately selected taking account of the forming method. For example, when using a melt extrusion method, the resin temperature of the resin composition [F] that comprises the modified hydrogenated block copolymer [E] as the main component is normally set to 120 to 220° C., preferably 130 to 200° C., and more preferably 140 to 190° C. If the resin temperature is too low, deterioration in fluidity may occur, and the resulting sheet may undergo significant shrinkage due to heating. If the resin temperature is too high, the resulting sheet may exhibit low adhesion to the adherend.

The resin composition [F] that comprises the modified hydrogenated block copolymer [E] as the main component may be melted in an extruder, and passed through a gear pump or a polymer filter before extruding the molten resin composition from a die provided to the extruder. A uniform amount of resin can be extruded, and a variation in thickness can be reduced by utilizing a gear pump. Foreign matter can be removed from the resin by utilizing a polymer filter, and a transparent pressure-sensitive adhesive sheet that has no defects and has an excellent external appearance can be obtained.

The transparent pressure-sensitive adhesive sheet according to one embodiment of the invention may be a multilayer sheet that utilizes two or more resin compositions [F] that differ in composition. One side or each side of the transparent pressure-sensitive adhesive sheet may be embossed, or the transparent pressure-sensitive adhesive sheet may be stored in a state in which a releasable PET film, polyolefin film, or the like is placed on one side or each side of the transparent pressure-sensitive adhesive sheet in order to prevent the occurrence of blocking and facilitate handling, for example.

The transparent pressure-sensitive adhesive sheet according to one embodiment of the invention may be used to bond a touch panel and a display device, bond a touch panel and a transparent cover, bond glass sheets to form a glass laminate, bond thin glass sheets, bond a thin glass sheet to a liquid crystal display device, or bond a thin glass sheet to a transparent resin substrate of an illumination apparatus, for example.

EXAMPLES

The invention is further described below by way of examples. Note that the invention is not limited to the following examples. The units "parts" and "%" respectively refer to "parts by weight" and "wt %" unless otherwise indicated.

The measurement methods and the evaluation methods used in connection with the examples are described below.
(1) Weight Average Molecular Weight (Mw) and Molecular Weight Distribution (Mw/Mn)

The molecular weight (standard polystyrene-equivalent value) of the block copolymer and the hydrogenated block copolymer was measured by GPC (eluent: THF) at 38° C. A GPC system "HLC8020GPC" (manufactured by Tosoh Corporation) was used to measure the molecular weight.
(2) Hydrogenation Rate The hydrogenation rate of the main chain, the side chain, and the aromatic ring of the hydrogenated block copolymer [D] was calculated from the $^1$H-NMR spectrum.
(3) Transparency of Transparent Pressure-Sensitive Adhesive Sheet Two transparent pressure-sensitive adhesive sheets (thickness: 150 μm) were placed between two releasable PET films. After performing vacuum deaeration at 60° C. for 5 minutes using a vacuum laminator, the laminate was pressed for 10 minutes under vacuum to prepare a light transmittance measurement transparent pressure-sensitive adhesive sheet (thickness: 300 μm). The light transmittance of the sheet at a wavelength of 470 nm, 550 nm, and 650 nm was measured using a UV spectrophotometer ("V-570" manufactured by JASCO Corporation).

(4) Storage Modulus

The transparent pressure-sensitive adhesive sheets (thickness: 150 μm) were placed one on top of the other, and pressed to prepare a sheet having a thickness of 1.0 mm. A specimen having a width of 10 mm and a length of 50 mm was prepared from the sheet, and the storage modulus (at 25° C.) of the specimen was measured using a viscoelastometer ("ARES" manufactured by TA Instruments Japan Inc.).

(5) Tackiness of Transparent Pressure-Sensitive Adhesive Sheet

The transparent pressure-sensitive adhesive sheet (thickness: 150 μm) was placed on a white glass sheet (thickness: 2 mm, width: 100 mm, length: 70 mm) so that a non-bonding area was provided at the end of the sheet. The laminate was put in an autoclave, and bonded at 50 to 70° C. for 10 minutes under a pressure of 0.9 MPa to prepare a peel strength measurement specimen. The specimen was removed from the autoclave, and allowed to stand at room temperature for 120 minutes. The surface of the sheet was cut at an interval of 15 mm, and subjected to a 180° peel test at a peel rate of 100 mm/min (from the non-bonding area of the sheet) in accordance with JIS K 6854-2 using an autograph ("AGS-10KNX" manufactured by Shimadzu Corporation) to measure the peel strength.

(6) Reworkability

A thin glass sheet (length: 100 mm, width: 70 mm, thickness: 210 μm) (manufactured by Shott) on which an ITO film was deposited on one side, was provided. The ITO film formed on the thin glass sheet was placed on a polarizing film (purchased from Tech Jam Co., Ltd., length: 100 mm, width: 70 mm, thickness: 0.2 mm) (in which a TAC protective film was provided on the surface) through the transparent pressure-sensitive adhesive sheet (thickness: 150 μm). The laminate was put in an autoclave, and bonded at 50 to 70° C. for 10 minutes under a pressure of 0.9 MPa to prepare a reworkability evaluation specimen. The specimen was removed from the autoclave, and allowed to stand at room temperature for 120 minutes.

The transparent pressure-sensitive adhesive sheet was removed from the polarizing film and the ITO-deposited glass sheet with the fingers, and the breakage or non-breakage of the thin glass sheet, the surface of the polarizing film, and the surface of the ITO-deposited glass sheet were observed with the naked eye to evaluate the reworkability. A case where the transparent pressure-sensitive adhesive sheet could be easily removed from the thin glass sheet without breakage, and the pressure-sensitive adhesive did not remain on the surface of the polarizing film and the surface of the ITO-deposited glass sheet was evaluated as "Good", and a case where the thin glass sheet broke when the transparent pressure-sensitive adhesive sheet was removed, and/or the pressure-sensitive adhesive remained, or left a mark was evaluated as "Bad".

(7) Adhesion of Transparent Pressure-Sensitive Adhesive Sheet

A specimen was prepared by bonding the transparent pressure-sensitive adhesive sheet to a white glass sheet in the same manner as described above (see "(5) Tackiness of transparent pressure-sensitive adhesive sheet"). The specimen was put in an autoclave, and bonded at 100° C. for 20 minutes under a pressure of 0.9 MPa to prepare an adhesion evaluation specimen. The specimen was removed from the autoclave, and allowed to stand at room temperature for 120 minutes. The surface of the sheet was cut at an interval of 15 mm, and subjected to a 180° peel test at a peel rate of 100 mm/min (from the non-bonding area of the sheet) in accordance with JIS K 6854-2 using an autograph to measure the peel strength.

(8) Heat Resistance

Two transparent pressure-sensitive adhesive sheets (thickness: 150 μm) were placed between two white glass sheets (thickness: 2 mm, length: 100 mm, width: 50 mm. After performing vacuum deaeration at 100° C. for 5 minutes using a vacuum laminator, the laminate was pressed for 10 minutes under vacuum to prepare a specimen (that was disposed between the white glass sheets). The specimen was held upright by holding one of the white glass sheets, stored at 100° C. for 24 hours in an oven, and observed with the naked eye. A case where no abnormalities (e.g., the displacement of glass or the occurrence of air bubbles) were observed was evaluated as "Good", and a case where abnormalities were observed was evaluated as "Bad".

Reference Example 1

Modified Hydrogenated Block Copolymer [E1]

Production of Block Copolymer [C1]

A reactor equipped with a stirrer in which the internal atmosphere had been sufficiently replaced with nitrogen, was charged with 550 parts of dehydrated cyclohexane, 25.0 parts of dehydrated styrene, and 0.475 parts of n-dibutyl ether. 0.60 parts of a 15% solution of n-butyllithium in cyclohexane was added to the mixture while stirring the mixture at 60° C. to initiate polymerization, and the mixture was reacted at 60° C. for 60 minutes with stirring. The polymerization conversion rate measured by gas chromatography was 99.5%.

After the addition of 50.0 parts of dehydrated isoprene, the resulting mixture was stirred for 30 minutes. The polymerization conversion rate was 99.5%.

After the addition of 25.0 parts of dehydrated styrene, the resulting mixture was stirred for 60 minutes. The polymerization conversion rate was about 100%. 0.5 parts of isopropyl alcohol was added to the mixture to terminate the reaction. The resulting block copolymer [C1] had a weight average molecular weight (Mw) of 69,200 and a molecular weight distribution (Mw/Mn) of 1.05, and the ratio "wA:wB" was 50:50.

Production of Hydrogenated Block Copolymer [D1]

The polymer solution obtained as described above was transferred to a pressure-resistant reactor equipped with a stirrer. After the addition of 8.0 parts of a nickel catalyst supported on diatomaceous earth ("E22U" manufactured by JGC Catalysts and Chemicals Ltd., nickel content (amount of nickel supported): 60%) (hydrogenation catalyst) and 100 parts of dehydrated cyclohexane, the mixture was mixed. After replacing the atmosphere inside the reactor with hydrogen gas, hydrogen was supplied to the reactor while stirring the solution to effect a hydrogenation reaction at 190° C. for 6 hours under a pressure of 4.5 MPa. The resulting hydrogenated block copolymer [D1] had a weight average molecular weight (Mw) of 73,300 and a molecular weight distribution (Mw/Mn) of 1.06.

After removing the hydrogenation catalyst from the reaction solution by means of filtration, 1.0 part of a solution prepared by dissolving 0.1 parts of pentaerythrityl tetrakis [3-(3,5-di-t-butyl-4-hydroxyphenyl)propionate] ("SONGNOX 1010" manufactured by KOYO Chemical Research Center) (phenol-based antioxidant) in xylene was added to and dissolved in the reaction solution.

After filtering the solution through a metal fiber filter (manufactured by Nichidai Corporation, pore size: 0.4 μm)

to remove fine solids, the solvent (cyclohexane and xylene) and other volatile components were removed from the solution at 260° C. under a pressure of 0.001 MPa or less using a cylindrical evaporator ("Kontro" manufactured by Hitachi Ltd.). The molten polymer was filtered at 260° C. using a polymer filter (manufactured by Fuji Filter Mfg. Co., Ltd.) provided with a stainless steel sintered filter (pore size: 5 μm) connected to an evaporator, extruded from a die in the shape of a strand, cooled, and cut using a pelletizer to obtain 96 parts of pellets of the hydrogenated block copolymer [D1]. The pellets of the hydrogenated block copolymer [D1] had a weight average molecular weight (Mw) of 72,500 and a molecular weight distribution (Mw/Mn) of 1.11, and the hydrogenation rate was about 100%.

Production of Modified Hydrogenated Block Copolymer [E1]

2.0 parts of vinyltrimethoxysilane and 0.2 parts of 2,5-dimethyl-2,5-di(t-butylperoxy)hexane ("PERHEXA (registered trademark) 25B" manufactured by NOF Corporation) were added to 100 parts of the pellets of the hydrogenated block copolymer [D1]. The mixture was kneaded at a resin temperature of 200° C. for a residence time of 60 to 70 seconds using a twin-screw extruder, and extruded in the shape of a strand. The extruded product was air-cooled, and cut using a pelletizer to obtain 95 parts of pellets of an alkoxysilyl group-containing modified hydrogenated block copolymer [E1].

After dissolving 10 parts of the pellets of the modified hydrogenated block copolymer [E1] in 100 parts of cyclohexane, the solution was poured into 400 parts of dehydrated methanol to coagulate the modified hydrogenated block copolymer [E1]. The modified hydrogenated block copolymer [E1] was filtered off, and dried at 25° C. under vacuum to isolate 9.0 parts of crumbs of the modified hydrogenated block copolymer [E1].

The FT-IR spectrum of the modified hydrogenated block copolymer [E1] was measured. An absorption peak attributed to an Si—OCH$_3$ group was observed at 1,090 cm$^{-1}$, and an absorption peak attributed to an Si—CH$_2$ group was observed at 825 cm$^{-1}$ and 739 cm$^{-1}$. These absorption peaks were observed at positions that differ from those (1,075 cm$^{-1}$, 808 cm$^{-1}$, 766 cm$^{-1}$) of vinyltrimethoxysilane.

An absorption band based on the proton of a methoxy group was observed at 3.6 ppm in the $^1$H-NMR spectrum (in deuterated chloroform). It was confirmed from the peak area ratio that 1.8 parts of vinyltrimethoxysilane was bonded to 100 parts of the hydrogenated block copolymer [D1].

Reference Example 2

Production of Modified Hydrogenated Block Copolymer [E2]
Production of Block Copolymer [C2]

A polymerization reaction was effected and terminated in the same manner as in Reference Example 1, except that 14.0 parts of styrene, 30.0 parts of isoprene, 12.0 parts of styrene, 30.0 parts of isoprene, and 14.0 parts of styrene were sequentially added, and the 15% solution of n-butyllithium in cyclohexane was used in a ratio of 0.58 parts. The resulting block copolymer [C2] had a weight average molecular weight (Mw) of 71,300 and a molecular weight distribution (Mw/Mn) of 1.07, and the ratio "wA:wB" was 40:60.

Production of Hydrogenated Block Copolymer [D2]

The polymer solution obtained as described above was subjected to a hydrogenation reaction in the same manner as in Reference Example 1. The resulting hydrogenated block copolymer [D2] had a weight average molecular weight (Mw) of 75,400 and a molecular weight distribution (Mw/Mn) of 1.08.

After completion of the hydrogenation reaction, an antioxidant was added to the reaction solution in the same manner as in Reference Example 1, followed by concentration and drying to obtain 94 parts of pellets of the hydrogenated block copolymer [D2]. The pellets of the hydrogenated block copolymer [D2] had a weight average molecular weight (Mw) of 74,700 and a molecular weight distribution (Mw/Mn) of 1.13, and the hydrogenation rate was about 100%.

Production of Modified Hydrogenated Block Copolymer [E2]

93 parts of pellets of a modified hydrogenated block copolymer [E2] were obtained in the same manner as in Reference Example 1, except that 100 parts of the pellets of the hydrogenated block copolymer [D2] were used.

The modified hydrogenated block copolymer [E2] was analyzed in the same manner as in Reference Example 1. It was found that 1.7 parts of vinyltrimethoxysilane was bonded to 100 parts of the hydrogenated block copolymer [D2].

Reference Example 3

Production of Modified Hydrogenated Block Copolymer [E3]
Production of Block Copolymer [C3]

A polymerization reaction was effected and terminated in the same manner as in Reference Example 1, except that 12.0 parts of styrene, 76.0 parts of isoprene, and 12.0 parts of styrene were sequentially added, and the 15% solution of n-butyllithium in cyclohexane was used in a ratio of 0.50 parts. The resulting block copolymer [C3] had a weight average molecular weight (Mw) of 81,600 and a molecular weight distribution (Mw/Mn) of 1.04, and the ratio "wA:wB" was 24:76.

Production of Hydrogenated Block Copolymer [D3]

The polymer solution obtained as described above was subjected to a hydrogenation reaction in the same manner as in Reference Example 1. The resulting hydrogenated block copolymer [D3] had a weight average molecular weight (Mw) of 86,300 and a molecular weight distribution (Mw/Mn) of 1.05.

After completion of the hydrogenation reaction, an antioxidant was added to the reaction solution in the same manner as in Reference Example 1, followed by concentration and drying to obtain 95 parts of pellets of the hydrogenated block copolymer [D3]. The pellets of the hydrogenated block copolymer [D3] had a weight average molecular weight (Mw) of 85,400 and a molecular weight distribution (Mw/Mn) of 1.12, and the hydrogenation rate was about 100%. A fine powder of ethylenebis(stearic acid amide) (anti-blocking agent) was caused to adhere to the pellets of the hydrogenated block copolymer [D3] in a ratio of 0.05 parts based on 100 parts of the pellets.

Production of Modified Hydrogenated Block Copolymer [E3]

82 parts of pellets of a modified hydrogenated block copolymer [E3] were obtained in the same manner as in Reference Example 1, except that 100 parts of the pellets of the hydrogenated block copolymer [D3] were used.

The modified hydrogenated block copolymer [E3] was analyzed in the same manner as in Reference Example 1. It was found that 1.9 parts of vinyltrimethoxysilane was bonded to 100 parts of the hydrogenated block copolymer [D3].

Reference Example 4

Production of Hydrogenated Isoprene Polymer [G3]

A reactor equipped with a stirrer in which the internal atmosphere had been sufficiently replaced with nitrogen, was charged with 400 parts of dehydrated cyclohexane, 25.0 parts of dehydrated isoprene, and 7.5 parts of n-dibutyl ether. 20.0 parts of a 15% solution of n-butyllithium in cyclohexane was added to the mixture at 60° C. with stirring to initiate polymerization, and the mixture was reacted at 60° C. for 30 minutes with stirring.

After the addition of 75.0 parts of dehydrated isoprene in three parts at an interval of 30 minutes, the mixture was stirred for 60 minutes. The polymerization conversion rate was about 100%.

3.0 parts of isopropyl alcohol was added to the reaction mixture to terminate the reaction. The resulting isoprene polymer had a number average molecular weight (Mn) of 1,900 and a molecular weight distribution (Mw/Mn) of 1.04.

The polymer solution obtained as described above was transferred to a pressure-resistant reactor equipped with a stirrer. After the addition of 1.5 parts of a nickel catalyst supported on diatomaceous earth ("E22U" manufactured by JGC Catalysts and Chemicals Ltd., nickel content (amount of nickel supported): 60%) (hydrogenation catalyst) and 50 parts of dehydrated cyclohexane, the resulting mixture was mixed (stirred). After replacing the atmosphere inside the reactor with hydrogen gas, hydrogen was supplied to the reactor while stirring the solution to effect a hydrogenation reaction at 160° C. for 4 hours under a pressure of 4.5 MPa. The resulting hydrogenated isoprene polymer [G3] had a number average molecular weight (Mn) of 1,900 and a molecular weight distribution (Mw/Mn) of 1.04.

After removing the hydrogenation catalyst from the reaction solution by means of filtration, 2.0 parts of a solution prepared by dissolving 0.1 parts of pentaerythrityl tetrakis [3-(3,5-di-t-butyl-4-hydroxyphenyl)propionate] (phenol-based antioxidant) in xylene was added to and dissolved in the reaction solution.

The solution was filtered through a Zeta Plus (registered trademark) filter 30H (manufactured by Cuno, pore size: 0.5 to 1 µm) to remove fine solids. The filtrate was heated to 50° C. under reduced pressure to evaporate 200 parts of cyclohexane (i.e., the filtrate was concentrated). 500 parts of isopropyl alcohol was added to the concentrate to separate hydrogenated polyisoprene as a viscous liquid.

After removing the supernatant liquid, volatile components were removed at 120° C. for 24 hours under reduced pressure to obtain 76 parts of a hydrogenated isoprene polymer [G3].

The resulting hydrogenated isoprene polymer [G3] had a number average molecular weight (Mn) of 2,000 and a molecular weight distribution (Mw/Mn) of 1.03, and the hydrogenation rate was about 100%.

Example 1

Resin Composition [F1]

25 parts of a hydrogenated terpene-based resin [H1] ("CLEARON (registered trademark) P105" manufactured by Yasuhara Chemical Co., Ltd.) (tackifier [H]) and 0.2 parts of 2-(2H-benzotriazol-2-yl)-4-(1,1,3,3-tetramethylbutyl)phenol ("TINUVIN (registered trademark) 329" manufactured by BASF Japan Ltd.) (UV absorber) were added to (mixed with) 100 parts of the pellets of the alkoxysilyl group-containing modified hydrogenated block copolymer [E1] obtained in Reference Example 1, and the resulting mixture was extruded at a resin temperature of 190° C. using a twin-screw extruder equipped with a side feeder that can feed a liquid. A hydrogenated isobutene polymer [G1] ("PARLEAM (registered trademark) 24" manufactured by NOF Corporation, standard polystyrene-equivalent number average molecular weight determined by GPC: 2,200) (hydrocarbon-based polymer [G]) was continuously added from the side feeder in a ratio of 30 parts based on 100 parts of the modified hydrogenated block copolymer [E1], and the resulting mixture was kneaded. The resin composition that had been sufficiently kneaded was extruded in the shape of a strand, air-cooled, and cut using a pelletizer to obtain 142 parts of pellets of a resin composition [F1].

Production of Sheet by Extrusion

The pellets of the resin composition [F1] were extruded using a T-die film melt extrusion device (width of T-die: 300 mm) (provided with an extruder having a screw with a diameter of 25 mm) and a sheet take-up device provided with a casting roll and a release film feed device (molten resin temperature: 150° C., T-die temperature: 150° C., casting roll temperature: 40° C.) while feeding a release PET film (thickness: 50 µm) to the surface of the casting roll to produce a transparent pressure-sensitive adhesive sheet (thickness: 150 µm) formed of the resin composition [F1] on the PET film. The resulting transparent pressure-sensitive adhesive sheet was wound around a roll together with the PET film.

Evaluation of Transparent Pressure-Sensitive Adhesive Sheet

The light transmittance, the storage modulus, the tackiness (bonding temperature: 70° C.), the reworkability (bonding temperature: 70° C.), the adhesion, and the heat resistance were evaluated using the transparent pressure-sensitive adhesive sheet. The transparent pressure-sensitive adhesive sheet had a light transmittance of 90% or more at a wavelength of 470 nm, 550 nm, and 650 nm (i.e., exhibited excellent transparency). The transparent pressure-sensitive adhesive sheet had a storage modulus of $1.0 \times 10^7$ Pa (i.e., exhibited excellent flexibility). The transparent pressure-sensitive adhesive sheet had a peel strength of 0.2 N/cm (i.e., could be bonded, and easily removed).

The transparent pressure-sensitive adhesive sheet could be removed from the surface of the ITO-deposited glass sheet and the surface of the polarizing film without breakage, and the pressure-sensitive adhesive resin composition did not remain on the surface of the ITO-deposited glass sheet and the surface of the polarizing film (i.e., the transparent pressure-sensitive adhesive sheet exhibited excellent reworkability). The transparent pressure-sensitive adhesive sheet had a peel strength of 7 N/cm (i.e., could not be easily removed) (i.e., the transparent pressure-sensitive adhesive sheet exhibited excellent adhesion). No abnormalities were observed during the heat resistance evaluation test. The results are shown in Table 1.

Example 2

Resin Composition [F2]

The components were kneaded in the same manner as in Example 1, except that an isobutene polymer [G2] ("Nisseki Polybutene HV-300" manufactured by JX Nippon Oil & Energy Corporation, number average molecular weight: 1,400) was used instead of the hydrogenated isobutene polymer [G1], and continuously added in a ratio of 20 parts based on 100 parts of the modified hydrogenated block copolymer [E1], to obtain 129 parts of pellets of a resin composition [F2] including the modified hydrogenated block copolymer [E1], the tackifier [H1], the isobutene polymer [G2], and the UV absorber.

Production of Sheet by Extrusion

The pellets of the resin composition [F2] were extruded in the same manner as in Example 1 to produce a transparent pressure-sensitive adhesive sheet (thickness: 150

Evaluation of Transparent Pressure-Sensitive Adhesive Sheet

The light transmittance, the storage modulus, the tackiness (bonding temperature: 70° C.), the reworkability (bonding temperature: 70° C.), the adhesion, and the heat resistance were evaluated using the transparent pressure-sensitive adhesive sheet. The results are shown in Table 1.

Example 3

Resin Composition [F3]

The components were kneaded in the same manner as in Example 1, except that the hydrogenated isoprene polymer [G3] (number average molecular weight: 2,000) obtained in Reference Example 4 was used instead of the hydrogenated isobutene polymer [G1], and continuously added in a ratio of 20 parts based on 100 parts of the modified hydrogenated block copolymer [E1], to obtain 130 parts of pellets of a resin composition [F3] including the modified hydrogenated block copolymer [E1], the tackifier [H1], the hydrogenated isoprene polymer [G3], and the UV absorber.

Production of Sheet by Extrusion

The pellets of the resin composition [F3] were extruded in the same manner as in Example 1 to produce a transparent pressure-sensitive adhesive sheet (thickness: 150 µm).

Evaluation of Transparent Pressure-Sensitive Adhesive Sheet

The light transmittance, the storage modulus, the tackiness (bonding temperature: 70° C.), the reworkability (bonding temperature: 70° C.), the adhesion, and the heat resistance were evaluated using the transparent pressure-sensitive adhesive sheet. The results are shown in Table 1.

Example 4

Resin Composition [F4]

The components were kneaded in the same manner as in Example 1, except that the modified hydrogenated block copolymer [E2] obtained in Reference Example 2 was used instead of the modified hydrogenated block copolymer [E1], the tackifier [H1] was used in a ratio of 30 parts based on 100 parts of the modified hydrogenated block copolymer [E2], and the hydrocarbon-based polymer [G] was not added, to obtain 122 parts of pellets of a resin composition [F4] including the modified hydrogenated block copolymer [E2], the tackifier [H1], and the UV absorber.

Production of Sheet by Extrusion

The pellets of the resin composition [F4] were extruded in the same manner as in Example 1 to produce a transparent pressure-sensitive adhesive sheet (thickness: 150

Evaluation of Transparent Pressure-Sensitive Adhesive Sheet

The light transmittance, the storage modulus, the tackiness (bonding temperature: 70° C.), the reworkability (bonding temperature: 70° C.), the adhesion, and the heat resistance were evaluated using the transparent pressure-sensitive adhesive sheet. The results are shown in Table 1.

Example 5

Resin Composition [F5]

The components were kneaded in the same manner as in Example 1, except that 100 parts of the modified hydrogenated block copolymer [E2] obtained in Reference Example 2 was used instead of the modified hydrogenated block copolymer [E1], to obtain 138 parts of pellets of a resin composition [F5] including the modified hydrogenated block copolymer [E2], the tackifier [H1], the hydrogenated isobutene polymer [G1], and the UV absorber.

Production of Sheet by Extrusion

The pellets of the resin composition [F5] were extruded in the same manner as in Example 1 to produce a transparent pressure-sensitive adhesive sheet (thickness: 150 µm).

Evaluation of Transparent Pressure-Sensitive Adhesive Sheet

The light transmittance, the storage modulus, the tackiness (bonding temperature: 70° C.), the reworkability (bonding temperature: 70° C.), the adhesion, and the heat resistance were evaluated using the transparent pressure-sensitive adhesive sheet. The results are shown in Table 1.

Example 6

Resin Composition [F6]

The components were kneaded in the same manner as in Example 1, except that the modified hydrogenated block copolymer [E3] obtained in Reference Example 3 was used instead of the modified hydrogenated block copolymer [E1], the tackifier [H1] was used in a ratio of 15 parts based on 100 parts of the modified hydrogenated block copolymer [E3], and the hydrocarbon-based polymer [G] was not added, to obtain 106 parts of pellets of a resin composition [F6] including the modified hydrogenated block copolymer [E3], the tackifier [H1], and the UV absorber.

Production of Sheet by Extrusion

The pellets of the resin composition [F6] were extruded in the same manner as in Example 1 to produce a transparent pressure-sensitive adhesive sheet (thickness: 150 µm).

Evaluation of Transparent Pressure-Sensitive Adhesive Sheet

The light transmittance, the storage modulus, the tackiness (bonding temperature: 70° C.), the reworkability (bonding temperature: 70° C.), the adhesion, and the heat resistance were evaluated using the transparent pressure-sensitive adhesive sheet. The results are shown in Table 1.

Comparative Example 1

Resin Composition [F'7]

The components were kneaded in the same manner as in Example 1, except that the hydrocarbon-based polymer [G] was not added, to obtain 108 parts of pellets of a resin composition [F'7] including the modified hydrogenated block copolymer [E1], the tackifier [H1], and the UV absorber.

Production of Sheet by Extrusion

The pellets of the resin composition [F'7] were extruded in the same manner as in Example 1 to produce a transparent pressure-sensitive adhesive sheet (thickness: 150 µm).

Evaluation of Transparent Pressure-Sensitive Adhesive Sheet

The light transmittance, the storage modulus, the tackiness (bonding temperature: 70° C.), the reworkability (bonding temperature: 70° C.), the adhesion, and the heat resistance were evaluated using the transparent pressure-sensitive adhesive sheet. The results are shown in Table 1.

Comparative Example 2

Resin Composition [F'8]

The components were kneaded in the same manner as in Example 1, except that 100 parts of the modified hydrogenated block copolymer [E3] obtained in Reference Example 3 was used instead of the modified hydrogenated block copolymer [E1], to obtain 132 parts of pellets of a resin composition [F'8] including the modified hydrogenated block copolymer [E3], the tackifier [H1], the hydrogenated isobutene polymer [G1], and the UV absorber.

Production of Sheet by Extrusion

The pellets of the resin composition [F'8] were extruded in the same manner as in Example 1 to produce a transparent pressure-sensitive adhesive sheet (thickness: 150 μm).

Evaluation of Transparent Pressure-Sensitive Adhesive Sheet

The light transmittance, the storage modulus, the tackiness (bonding temperature: 50° C.), the reworkability (bonding temperature: 50° C.), the adhesion, and the heat resistance were evaluated using the transparent pressure-sensitive adhesive sheet. The results are shown in Table 1.

Comparative Example 3

Resin Composition [F'9]

The components were kneaded in the same manner as in Example 1, except that the tackifier [H1] was used in a ratio of 30 parts based on 100 parts of the modified hydrogenated block copolymer [E1], and the hydrogenated isobutene polymer [G1] was used in a ratio of 65 parts based on 100 parts of the modified hydrogenated block copolymer [E1], to obtain 172 parts of pellets of a resin composition [F'9] including the modified hydrogenated block copolymer [E1], the tackifier [H1], the hydrogenated isobutene polymer [G1], and the UV absorber.

Production of Sheet by Extrusion

The pellets of the resin composition [F'9] were extruded in the same manner as in Example 1 to produce a transparent pressure-sensitive adhesive sheet (thickness: 150 μm).

Evaluation of Transparent Pressure-Sensitive Adhesive Sheet

The light transmittance, the storage modulus, the tackiness (bonding temperature: 50° C.), the reworkability (bonding temperature: 50° C.), the adhesion, and the heat resistance were evaluated using the transparent pressure-sensitive adhesive sheet. The results are shown in Table 1.

TABLE 1

| | | | Unit | Example 1 [F1] | Example 2 [F2] | Example 3 [F3] | Example 4 [F4] | Example 5 [F5] | Example 6 [F6] |
|---|---|---|---|---|---|---|---|---|---|
| Resin composition [F] | Modified hydrogenated block copolymer [E] | [E1] wA:wB = 50:50 | Parts | 100 | 100 | 100 | | | |
| | | [E2] wA:wB = 40:60 | Parts | | | | 100 | 100 | |
| | | [E3] wA:wB = 24:76 | Parts | | | | | | 100 |
| | Low-molecular-weight hydrocarbon-based polymer [G] | [G1] Mn = 2,200 | Parts | 30 | | | | 30 | |
| | | [G2] Mn = 1,400 | Parts | | 20 | | | | |
| | | [G3] Mn = 2,000 | Parts | | | 20 | | | |
| | Tackifier [H] | [H1] | Parts | 25 | 25 | 25 | 30 | 25 | 15 |
| | UV absorber | | Parts | 0.2 | 0.2 | 0.2 | 0.2 | 0.2 | 0.2 |
| Evaluation of transparent pressure-sensitive adhesive sheet | Light transmittance | 470 nm | % | 90 | 90 | 90 | 90 | 90 | 90 |
| | | 550 nm | % | 91 | 91 | 91 | 91 | 91 | 91 |
| | | 650 nm | % | 91 | 91 | 91 | 91 | 91 | 91 |
| | Storage modulus | 25° C. | Pa | $1.0 \times 10^7$ | $1.9 \times 10^7$ | $2 \times 10^7$ | $1.8 \times 10^7$ | $6 \times 10^6$ | $1.6 \times 10^6$ |
| | Tackiness | Peel strength | N/cm | 0.2 | 0.3 | 0.3 | 0.2 | 0.7 | 1.5 |
| | Reworkability | | — | Good | Good | Good | Good | Good | Good |
| | Adhesion | Peel strength | N/cm | 7 | >10 | >10 | 8 | >10 | >10 |
| | Heat resistance | Change in external appearance | — | Good | Good | Good | Good | Good | Good |

| | | | Unit | Comparative Example 1 [F'7] | Comparative Example 2 [F'8] | Comparative Example 3 [F'9] |
|---|---|---|---|---|---|---|
| Resin composition [F] | Modified hydrogenated block copolymer [E] | [E1] wA:wB = 50:50 | Parts | 100 | | 100 |
| | | [E2] wA:wB = 40:60 | Parts | | | |
| | | [E3] wA:wB = 24:76 | Parts | | 100 | |
| | Low-molecular-weight hydrocarbon-based polymer [G] | [G1] Mn = 2,200 | Parts | | 30 | 65 |
| | | [G2] Mn = 1,400 | Parts | | | |
| | | [G3] Mn = 2,000 | Parts | | | |
| | Tackifier [H] | [H1] | Parts | 25 | 25 | 30 |
| | UV absorber | | Parts | 0.2 | 0.2 | 0.2 |
| Evaluation of transparent pressure-sensitive adhesive sheet | Light transmittance | 470 nm | % | 90 | 90 | 87 |
| | | 550 nm | % | 91 | 91 | 88 |
| | | 650 nm | % | 91 | 91 | 89 |
| | Storage modulus | 25° C. | Pa | $1.2 \times 10^8$ | $7 \times 10^5$ | $9 \times 10^5$ |
| | Tackiness | Peel strength | N/cm | <0.1 | 1.8 | 1.1 |
| | Reworkability | | — | — | Bad | Bad |
| | Adhesion | Peel strength | N/cm | 2 | >10 | 4 |
| | Heat resistance | Change in external appearance | — | Good | Bad | Bad |

The following were confirmed from the results shown in Table 1.

The transparent pressure-sensitive adhesive sheets according to the embodiments of the invention had high light transmittance in the visible region, had a storage modulus at 25° C. of $1 \times 10^6$ to $1 \times 10^8$ Pa, had a peel strength of 2 N/cm or less (i.e., could be easily removed) when bonded to the adherend at a relatively low temperature (70° C.) (i.e., exhibited excellent tackiness and excellent reworkability), and had an adhesion as high as 3 N/cm or more when heated to a higher temperature (100° C.). The transparent pressure-sensitive adhesive sheets according to the embodiments of the invention showed no change in external appearance when stored at 80° C. (i.e., exhibited excellent heat resistance) (Examples 1 to 6).

When the transparent pressure-sensitive adhesive sheet had a storage modulus at 25° C. of more than $1 \times 10^8$ Pa, the transparent pressure-sensitive adhesive sheet exhibited almost no tackiness (peel strength: less than 0.1 N/cm) when bonded to the adherend at 70° C. (i.e., the transparent pressure-sensitive adhesive sheet is not suitable for temporary bonding). The transparent pressure-sensitive adhesive sheet had low adhesion (peel strength: less than 3 N/cm) when heated to a higher temperature (100° C.) (Comparative Example 1).

When the transparent pressure-sensitive adhesive sheet had a storage modulus at 25° C. of less than $1 \times 10^6$ Pa, the tackiness of the transparent pressure-sensitive adhesive sheet could be controlled when the transparent pressure-sensitive adhesive sheet was bonded to the adherend at a lower temperature (50° C.), and a peel strength of 2 N/cm or less was obtained. However, the transparent pressure-sensitive adhesive sheet showed a significant elongation during removal (i.e., exhibited poor reworkability). The displacement of glass was observed during the heat resistance test (i.e., the transparent pressure-sensitive adhesive sheet exhibited poor heat resistance) (Comparative Example 2).

When the hydrocarbon-based polymer [G] having a number average molecular weight of 5,000 or less was used in too high a ratio, the transparent pressure-sensitive adhesive sheet had a storage modulus at 25° C. of less than $1 \times 10^6$ Pa, showed a significant elongation during removal (i.e., exhibited poor reworkability), exhibited poor heat resistance, and had low transparency (i.e., the transparent pressure-sensitive adhesive sheet is not suitable for optical applications) (Comparative Example 3).

INDUSTRIAL APPLICABILITY

The transparent pressure-sensitive adhesive sheet (double-sided, transparent pressure-sensitive adhesive sheet) according to the embodiments of the invention is used to bond (secure) two optical members (adherends), exhibits excellent reworkability and excellent adhesion, and is suitable as an optical transparent pressure-sensitive adhesive sheet that is used to bond a touch panel and a polarizing film, or bond a touch panel and cover glass, for example.

The invention claimed is:

1. A transparent pressure-sensitive adhesive sheet that is formed of a resin composition [F], and has a storage modulus at 25° C. of $1 \times 10^6$ to $1 \times 10^8$ Pa, the resin composition [F] comprising a modified hydrogenated block copolymer [E] as a main component, and a tackifier [H] in a ratio of 1 to 50 parts by weight based on 100 parts by weight of the modified hydrogenated block copolymer [E], the modified hydrogenated block copolymer [E] being obtained by introducing an alkoxysilyl group into a hydrogenated block copolymer [D], the hydrogenated block copolymer [D] being obtained by hydrogenating 90% or more of unsaturated bonds of a block copolymer [C] that comprises at least two polymer blocks [A] and at least one polymer block [B], the polymer block [A] comprising a repeating unit derived from an aromatic vinyl compound as a main component, the polymer block [B] comprising a repeating unit derived from a chain conjugated diene compound as a main component, and a ratio (wA:wB) of a total weight fraction wA of the polymer block [A] in the block copolymer [C] to a total weight fraction wB of the polymer block [B] in the block copolymer [C] being 20:80 to 60:40.

2. The transparent pressure-sensitive adhesive sheet according to claim 1, wherein the resin composition [F] further comprises a hydrocarbon-based polymer [G] having a number average molecular weight of 300 to 5,000 in a ratio of 1 to 50 parts by weight based on 100 parts by weight of the modified hydrogenated block copolymer [E].

3. The transparent pressure-sensitive adhesive sheet according to claim 1, wherein the storage modulus at 25° C. is $2 \times 10^6$ to $5 \times 10^7$ Pa.

4. The transparent pressure-sensitive adhesive sheet according to claim 1, wherein the storage modulus at 25° C. is $3 \times 10^6$ to $1 \times 10^7$ Pa.

5. The transparent pressure-sensitive adhesive sheet according to claim 1, which has a 180° peel strength at 70° C. of 0.1 to 2.0 N/cm.

6. The transparent pressure-sensitive adhesive sheet according to claim 1, which has a 180° peel strength at 70° C. of 0.2 to 1.5 N/cm.

7. The transparent pressure-sensitive adhesive sheet according to claim 1, which has a 180° peel strength at 70° C. of 0.3 to 1.0 N/cm.

8. The transparent pressure-sensitive adhesive sheet according to claim 1, which has a 180° peel strength after heating to 100° C. of 3.0 N/cm or more.

9. The transparent pressure-sensitive adhesive sheet according to claim 1, which has a 180° peel strength after heating to 100° C. of 5.0 N/cm or more.

10. The transparent pressure-sensitive adhesive sheet according to claim 1, which has a 180° peel strength after heating to 100° C. of 7.0 N/cm or more.

* * * * *